(12) United States Patent
Kawashima et al.

(10) Patent No.: US 9,746,021 B2
(45) Date of Patent: Aug. 29, 2017

(54) FASTENING STRUCTURE

(71) Applicant: TOYOTA JIDOSHA KABUSHIKI KAISHA, Toyota-shi, Aichi-ken (JP)

(72) Inventors: Mutsumi Kawashima, Nisshin (JP); Miho Mizukoshi, Obu (JP); Hidetoshi Hayashi, Toyota (JP); Shinya Kamimura, Toyota (JP); Koki Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/037,134

(22) PCT Filed: Nov. 18, 2014

(86) PCT No.: PCT/JP2014/080536
§ 371 (c)(1),
(2) Date: May 17, 2016

(87) PCT Pub. No.: WO2015/076270
PCT Pub. Date: May 28, 2015

(65) Prior Publication Data
US 2016/0305466 A1    Oct. 20, 2016

(30) Foreign Application Priority Data

Nov. 22, 2013  (JP) ................... 2013-242238
Sep. 5, 2014  (JP) ................... 2014-181424

(51) Int. Cl.
F16B 43/02    (2006.01)
F16B 43/00    (2006.01)
F16B 5/02    (2006.01)

(52) U.S. Cl.
CPC .............. *F16B 43/001* (2013.01); *F16B 5/02* (2013.01)

(58) Field of Classification Search
CPC .......... F16B 5/02; F16B 43/00; F16B 43/001; F16B 43/02
USPC ................ 411/353, 383, 517, 531, 542, 546
See application file for complete search history.

(56) References Cited

U.S. PATENT DOCUMENTS

| | | | | |
|---|---|---|---|---|
| 2,132,636 A | * | 10/1938 | Maahs | ................ F16L 41/088 |
| | | | | 285/208 |
| 2,982,573 A | * | 5/1961 | McKee, Jr. | ........... F16B 43/001 |
| | | | | 277/637 |
| 3,286,577 A | * | 11/1966 | Weidner, Jr. | ......... F16B 43/001 |
| | | | | 277/640 |
| 3,783,734 A | * | 1/1974 | Velthoven | ............. F16B 31/028 |
| | | | | 411/8 |
| 4,238,165 A | * | 12/1980 | Wagner | ................... F16B 39/26 |
| | | | | 403/408.1 |

(Continued)

FOREIGN PATENT DOCUMENTS

| JP | S60-89402 U | 6/1985 |
|---|---|---|
| JP | H02-40106 U | 3/1990 |

(Continued)

*Primary Examiner* — Roberta Delisle
(74) *Attorney, Agent, or Firm* — Oliff PLC

(57) ABSTRACT

A sealing rubber is integrally molded to an outer peripheral face and a lower face of a flange portion of a collar, and a protruding portion is continuously formed along the circumferential direction around a through-hole in an upper face of a resin member.

8 Claims, 5 Drawing Sheets

(56) References Cited

U.S. PATENT DOCUMENTS

| | | | | |
|---|---|---|---|---|
| 4,732,519 A | * | 3/1988 | Wagner | F16B 5/0258 403/14 |
| 4,863,329 A | * | 9/1989 | Wilson | F16B 5/02 248/635 |
| 5,165,834 A | * | 11/1992 | Takenouchi | F16B 43/001 277/651 |
| 5,244,325 A | * | 9/1993 | Knohl | F02B 77/00 411/107 |
| 6,044,536 A | * | 4/2000 | Schneider | F16B 41/002 29/437 |
| 6,059,503 A | * | 5/2000 | Johnson | F16B 41/002 411/353 |
| 6,328,513 B1 | * | 12/2001 | Niwa | G10K 11/168 16/2.1 |
| 6,623,226 B2 | * | 9/2003 | Braun | F16B 5/02 411/107 |
| 6,659,702 B2 | * | 12/2003 | Kitayama | F16B 43/001 403/408.1 |
| 6,938,385 B2 | * | 9/2005 | Lind | B32B 17/10293 411/107 |
| 7,086,688 B2 | * | 8/2006 | Edwards | B62D 25/087 296/181.3 |
| 2005/0201846 A1 | * | 9/2005 | Santamaria | B62D 25/163 411/108 |
| 2008/0310932 A1 | | 12/2008 | McIntyre et al. | |
| 2010/0251661 A1 | * | 10/2010 | Illgner | F16B 33/004 52/698 |

FOREIGN PATENT DOCUMENTS

| | | |
|---|---|---|
| JP | 2007-263300 A | 10/2007 |
| JP | 2008-304023 A | 12/2008 |
| JP | 2010-253697 A | 11/2010 |
| JP | 2012-251583 A | 12/2012 |
| JP | 2013-221597 A | 10/2013 |

* cited by examiner

FASTENING STRUCTURE

TECHNICAL FIELD

The present invention relates to a fastening structure for fastening and fixing a resin member to a metal member.

BACKGROUND ART

In a component fastening structure described in Japanese Patent Application Laid-Open (JP-A) No. 2012-251583, a circular tube-shaped collar member is attached inside a through-hole of an inner panel. A ring-shaped projection portion projects out at an inner edge portion of the inner panel. A circular-shaped flange portion is coaxially provided to a bolt made of metal, and the flange portion is capable of abutting the ring-shaped projection portion. The ring-shaped projection portion comes into close contact with a lower face of the flange portion when the bolt is fastened. JP-A Nos. 2007-263300 and 2008-304023 also describe technology relating to a fastening structure of a metal member and a resin member.

SUMMARY OF INVENTION

Technical Problem

In consideration of the above circumstances, an object of the present invention is to obtain a fastening structure capable of improving sealing performance between a metal member and a resin member.

A first aspect of the present invention provides a fastening structure including: a plate-shaped metal member that is formed with a first through-hole through which a fastener is inserted; a plate-shaped resin member that overlaps the metal member, that is formed with a second through-hole with a larger diameter than the first through-hole, and that is fastened to the metal member by the fastener; a collar that is made of metal and includes a tube portion inserted into the second through-hole and formed with a third through-hole through which the fastener is inserted, and a flange portion disposed facing the resin member in a state in which the tube portion has been inserted into the second through-hole; and an elastic member that is integrally provided at the collar, that is disposed between the flange portion and the resin member, and that covers an outer peripheral face of the flange portion and a lower face that is a face of the flange portion facing the resin member. On the elastic member, a press-contact portion is provided that projects toward a side of the resin member and is press-contacted against the resin member in a state in which the resin member has been fastened to the metal member by the fastener. On the collar, a projection portion that projects toward the resin member side at a position of the flange portion facing the resin member and that has a leading end portion formed in a bulge-shape bulging toward a side of the resin member, is formed on the lower face of the flange portion. The press-contact portion and the projection portion are provided at positions that overlap with each other as viewed from a direction in which fastening force due to the fastener acts.

In the above configuration, the plate-shaped resin member overlaps the plate-shaped metal member and they are fastened together by the fastener. The first through-hole through which the fastener is inserted is formed in the metal member, and the second through-hole that has a larger diameter than the first through-hole is formed in the resin member. The tube portion that configures part of the collar made of metal is capable of being inserted into the second through-hole, and the flange portion is disposed facing the resin member in the state in which the tube portion has been inserted into the second through-hole.

The elastic member is integrally provided to the collar. The elastic member is disposed between the flange portion of the collar and the resin member, and covers the outside face (that has a round shape, an angular shape, a wave shape, or the like) of the flange portion and a face of the flange portion facing the resin member. This enables water, dust, and the like to be suppressed or prevented from entering between the metal member and the resin member. Note that "integrally" referred to herein includes, as well as cases in which the collar and the elastic member have been integrally formed by molding as an integral unit, cases in which the collar and the elastic member have been integrated together by press-fitting, adhesive, or the like.

In the above configuration, the press-contact portion that is press-contacted against the resin member in a state in which the resin member has been fastened to the metal member by the fastener is also formed to the elastic member. This enables sealing performance between the collar and the resin member to be improved by the press-contact portion.

In the above configuration, the projection portion that projects out toward the resin member side at a position facing the resin member is also formed on the flange portion of the collar, thereby enabling the elastic member to be pressed against the resin member by the projection portion. This enables sealing performance between the collar and the resin member to be further improved.

In the above configuration, the press-contact portion formed to the elastic member side of the collar and the projection portion formed to the flange portion side of the collar are provided at positions that overlap with each other as viewed from the direction in which fastening force due to the fastener acts. Accordingly, force of the projection portion of the collar pressing against the elastic member acts in a state in which the resin member has been fastened to the metal member by the fastener.

This enables press-contact force toward the resin member by the press-contact portion to be increased, and enables sealing performance between the collar and the resin member to be further improved, compared, for example, to a case in which the press-contact portion and the projection portion are provided in positions that are offset from each other viewed from the direction in which fastening force due to the fastener acts.

A second aspect of the present invention is the first aspect of the present invention, wherein the resin member may include a protruding portion that digs into the elastic member in a state in which the resin member has been fastened to the metal member by the fastener.

In the above configuration, the protruding portion that digs into the elastic member in the state in which the resin member has been fastened to the metal member by the fastener is formed on the resin member. This enables relative movement between the resin member and the elastic member to be restricted in a shear direction (a direction orthogonal to a fastening direction of the fastener) by the protruding portion. Since the elastic member is integrally provided to the collar, relative movement between the collar and the resin member can be restricted in the shear direction as a result.

A third aspect of the present invention is the second aspect of the present invention, wherein the protruding portion may be continuously formed around the second through-hole.

In the above configuration, the protruding portion is continuously formed around the second through-hole, thereby enabling sealing performance between the metal member and the resin member to be further improved by the protruding portion.

A fourth aspect of the present invention is the second aspect of the present invention, wherein the protruding portion is intermittently formed around the second through-hole.

In the above configuration, the protruding portion is intermittently formed around the second through-hole, thereby enabling relative movement between the collar and the resin member, in the shear direction orthogonal to the fastening direction by the fastener, to be restricted.

A fifth aspect of the present invention is any one of the first aspect to the fourth aspect of the present invention, wherein, on the elastic member, a press-contact portion may be provided that is press-contacted against the resin member in a state in which the resin member has been fastened to the metal member by the fastener.

In the above configuration, the press-contact portion that is press-contacted against the resin member in the state in which the resin member has been fastened to the metal member by the fastener is formed on the elastic member, thereby enabling sealing performance between the collar and the resin member to be improved by the press-contact portion.

A sixth aspect of the present invention is any one of the first aspect to the fifth aspect of the present invention, wherein, on the collar, a projection portion is formed that projects toward a side of the resin member at a position of the flange portion facing the resin member.

In the above configuration, on the flange portion of the collar, the projection portion is formed projecting toward a side of the resin member at a position facing the resin member, thereby enabling the elastic member to be pressed by the projection portion against the resin member. This enables sealing performance between the collar and the resin member to be further improved.

A seventh aspect of the present invention is the sixth aspect of the present invention, wherein on the elastic member, a press-contact portion that is press-contacted against the resin member in a state in which the resin member has been fastened to the metal member by the fastener, and the projection portion, are provided in positions that overlap with each other as viewed from a direction in which fastening force due to the fastener acts.

In the above configuration, the press-contact portion formed at the elastic member side of the collar, and the projection portion formed at the flange portion side of the collar, are provided in positions that overlap with each other as viewed from the direction in which fastening force due to the fastener acts. Thus, in the state in which the resin member has been fastened to the metal member by the fastener, a pressing force acts on the elastic member due to the projection portion of the collar.

Press-contact force against the resin member due to the press-contact portion thereby increases, thereby enabling sealing performance between the collar and the resin member to be further increased compared to, for example, cases in which the press-contact portion and the projection portion are provided in positions that are offset from each other viewed from the direction in which fastening force due to the fastener acts.

A second aspect of the present invention is the first aspect of the present invention, wherein on the elastic member, the press-contact portion that is press-contacted against the resin member in a state in which the resin member has been fastened to the metal member by the fastener is continuously formed around the second through-hole.

In the above configuration, the press-contact portion formed at the elastic member side of the collar is continuously formed around the second through-hole formed in the resin member, thereby enabling sealing performance to be further improved between the collar and the resin member by the press-contact portion.

A third aspect of the present invention is the first aspect of the present invention, wherein on the elastic member, the press-contact portion that is press-contacted against the resin member in a state in which the resin member has been fastened to the metal member by the fastener is intermittently formed around the second through-hole.

In the above configuration, the press-contact portion formed to the elastic member of the collar is intermittently formed around the second through-hole formed in the resin member, thereby enabling relative movement between the collar and the resin member, in the shear direction orthogonal to the fastening direction by the fastener, to be restricted.

A fourth aspect of the present invention is any one of the first aspect to the third aspect of the present invention, wherein on the collar, the projection portion that projects toward the resin member side at a position of the flange portion facing the resin member is, continuously formed around the second through-hole.

In the above configuration, the projection portion formed on the flange portion of the collar is continuously formed around the second through-hole formed in the resin member, thereby enabling sealing performance to be further improved between the collar and the resin member by the projection portion.

A fifth aspect of the present invention is any one of the first aspect to the third aspect of the present invention, wherein on the collar, the projection portion that projects toward the resin member side at a position of the flange portion facing the resin member, is intermittently formed around the second through-hole.

In the above configuration, the projection portion formed on the flange portion of the collar is intermittently formed around the second through-hole formed in the resin member, thereby enabling relative movement between the collar and the resin member, in the shear direction orthogonal to the fastening direction by the fastener, to be restricted.

A sixth aspect of the present invention is any one of the first aspect to the fifth aspect of the present invention, wherein the elastic member wraps around an outside face of the flange portion and extends as far as a region contacting the fastener.

In the above configuration, the elastic member extends from the outside face of the flange portion of the collar as far as a region contacting the fastener, such that the elastic member is also provided between the flange portion and the fastener. This enables water, dust, and the like to be suppressed or prevented from entering between the collar and the fastener.

A seventh aspect of the present invention is any one of the first aspect to the sixth aspect of the present invention, wherein the elastic member is integrally molded to the collar.

In the above configuration, the elastic member is integrally molded to the collar, thereby reducing manufacturing compared to, for example, cases in which the elastic member is press-fitted to the collar.

An eighth aspect of the present invention is the sixth aspect of the present invention, wherein a depressed portion that is formed a step lower than an upper face of the flange portion is provided at the upper face of the flange portion, further to an outerside than an outer peripheral face of the tube portion, and the depressed portion of the flange portion, the outer peripheral face of the flange portion, and the lower face of the flange portion are covered by the elastic member.

Advantageous Effects of Invention

The first aspect of the present invention has an excellent advantageous effect of enabling the sealing performance between the metal member and the resin member to be improved. Another excellent advantageous effect is enabling relative movement between the collar and the resin member, in the shear direction orthogonal to the fastening direction by the fastener, to be restricted by the press-contact portion formed on the elastic member of the collar. Another excellent advantageous effect is enabling relative movement between the collar and the resin member, in the shear direction orthogonal to the fastening direction by the fastener, to be restricted by the projection portion formed on the flange portion of the collar. Relative movement between the collar and the resin member can be further restricted in the shear direction by the projection portion formed on the flange portion of the collar and the press-contact portion formed on the elastic member.

The second aspect of the present invention has an excellent advantageous effect of enabling relative movement between the collar and the resin member, in the shear direction orthogonal to the fastening direction by the fastener, to be restricted by the protruding portion formed on the resin member.

The third aspect of the present invention has an excellent advantageous effect of enabling the sealing performance between the metal member and the resin member to be further improved by the protruding portion formed on the resin member.

The fourth aspect of the present invention has an excellent advantageous effect of enabling relative movement between the collar and the resin member, in the shear direction orthogonal to the fastening direction by the fastener, to be restricted by the protruding portion formed on the elastic member of the collar.

The fifth aspect of the present invention has an excellent advantageous effect of enabling relative movement between the collar and the resin member, in the shear direction orthogonal to the fastening direction by the fastener, to be restricted by the press-contact portion formed on the elastic member of the collar.

The sixth aspect of the present invention has an excellent advantageous effect of enabling relative movement between the collar and the resin member, relative movement between the collar and the resin member, in the shear direction orthogonal to the fastening direction by the fastener, to be restricted by the projection portion formed on the flange portion of the collar.

The seventh aspect of the present invention enables relative movement between the collar and the resin member in the shear direction to be further restricted by the projection portion formed on the flange portion of the collar and the press-contact portion formed on the elastic member.

The second aspect of the present invention has an excellent advantageous effect of enabling the sealing performance be further improved between the collar and the resin member by the press-contact portion formed on the elastic member of the collar.

The third aspect of the present invention has an excellent advantageous effect of enabling relative movement between the collar and the resin member, in the shear direction orthogonal to the fastening direction by the fastener, to be restricted by the press-contact portion formed on the elastic member of the collar.

The fourth aspect of the present invention has an excellent advantageous effect of enabling the sealing performance between the collar and the resin member to be further improved by the projection portion formed on the flange portion of the collar, and the elastic member.

The fifth aspect of the present invention has an excellent advantageous effect of enabling relative movement between the collar and the resin member, in the shear direction orthogonal to the fastening direction by the fastener, to be restricted by the projection portion formed on the flange portion of the collar and the elastic member.

The sixth aspect of the present invention has an excellent advantageous effect of enabling water, dust, and the like to be suppressed or prevented from entering between the collar and the fastener by the elastic member of the collar.

The seventh aspect of the present invention has an excellent advantageous effect of enabling a reduction in cost to be achieved.

DESCRIPTION OF EMBODIMENTS

Explanation follows regarding exemplary embodiments of a fastening structure according to the present invention, with reference to the drawings. Note that for ease of explanation, the arrow UP indicates the up-down direction in the respective drawings, and "up" and "down" are sometimes added to the explanation based on this; however, the direction of the respective portions is not limited by adding "up" and "down" to the explanation.

First Exemplary Embodiment

Fastening Structure Configuration

Figure 1:
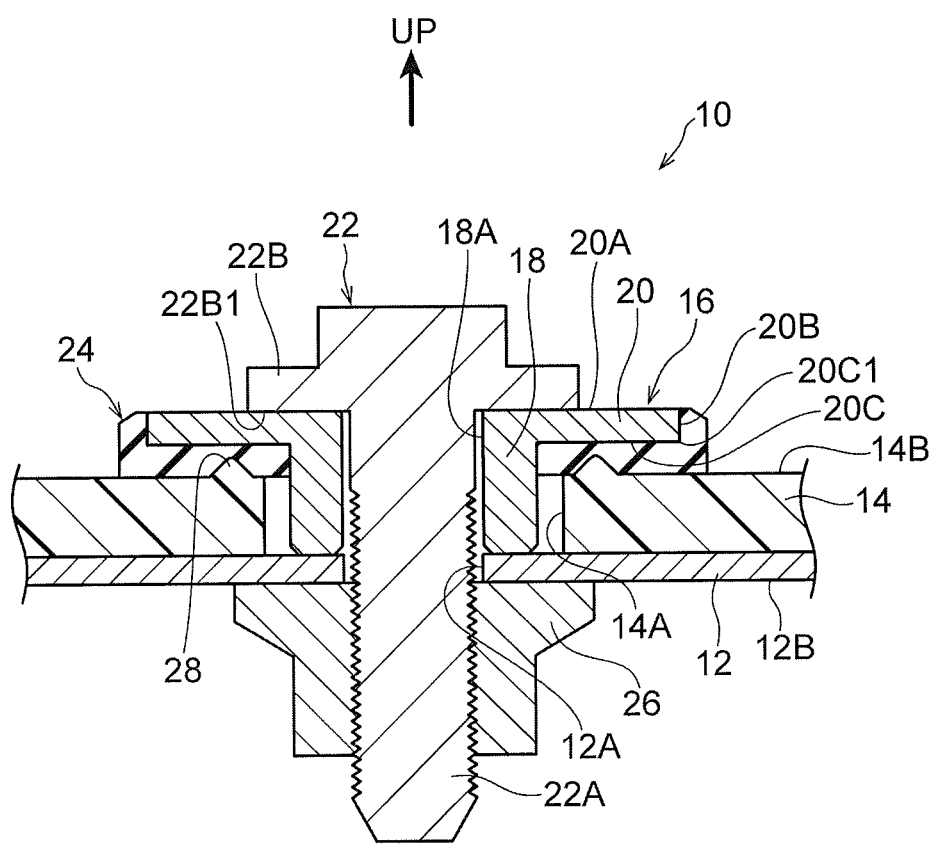
FIG. 1 is a cross-section illustrating a fastening structure according to a first exemplary embodiment.

Explanation first follows regarding a fastening structure according to a first exemplary embodiment. FIG. 1 is a cross-section illustrating a fastening structure 10 according to the first exemplary embodiment. As illustrated in FIG. 1, the fastening structure 10 includes a metal member 12 with a plate shape, and a plate-shaped resin member 14 that overlaps the metal member 12. A circular-shaped through-hole 12A, serving as a first through-hole, is formed in the metal member 12, and a shaft portion 22A of a flange bolt 22, serving as a fastener, is inserted inside the through-hole 12A.

A circular-shaped through-hole 14A, serving as a second through-hole and set with a larger diameter than the through-hole 12A, is formed in the resin member 14. A tube portion 18, provided to a collar 16 made of metal, is capable of being inserted inside the through-hole 14A. A through-hole 18A, serving as a third through-hole through which the shaft portion 22A of the flange bolt 22, serving as the fastener, is inserted, is formed in the tube portion 18.

A circular plate-shaped flange portion 20 juts out toward the outside of the tube portion 18 from an upper end portion of the tube portion 18. The flange portion 20 is disposed facing an upper face 14B of the resin member 14. A lower face 22B1 of a flange portion 22B of the flange bolt 22 is capable of abutting an upper face 20A of the flange portion 20. Sealing rubber 24 (described later), serving as a bottomed, tube-shaped elastic member with one open end, is integrally molded to the collar 16 so as to cover an outer peripheral face 20B serving as an outside face of the flange portion 20, and a lower face 20C serving as a face facing the resin member 14.

A weld nut 26 is provided coaxially to the through-hole 12A at a lower face 12B of the metal member 12, and is capable of being screwed together with the shaft portion 22A of the flange bolt 22 that has passed through the through-hole 18A of the collar 16 and the through-hole 12A of the metal member 12.

Note that a protruding portion 28 is continuously formed along the circumferential direction around the through-hole 14A in the upper face 14B (the face at the opposite side to the metal member 12) of the resin member 14, at the through-hole 14A side positioned below the flange portion 22B of the flange bolt 22. A cross-section profile of the protruding portion 28 sectioned along the up-down direction forms a triangular shape.

Operation and Advantageous Effects of Fastening Structure

As illustrated in FIG. 1 and as described above, the sealing rubber 24 is integrally molded to the outer peripheral face 20B and the lower face 20C of the flange portion 20 of the collar 16 in the present exemplary embodiment. The protruding portion 28 is continuously formed along the circumferential direction around the through-hole 14A in the upper face 14B of the resin member 14, at the through-hole 14A side positioned below the flange portion 22B of the flange bolt 22.

In a state in which the through-hole 12A of the metal member 12 and the through-hole 14A of the resin member 14 are disposed substantially coaxially to each other, the metal member 12 and the resin member 14 overlap each other. The collar 16 is disposed inside the through-hole 14A of the resin member 14 so that the through-hole 18A of the tube portion 18 and the through-hole 12A of the metal member 12 are also disposed substantially coaxially to each other.

The flange bolt 22 is screwed together with the weld nut 26 provided at the lower face 12B of the metal member 12 in this state. In a state in which the resin member 14 has been fastened to the metal member 12 by the flange bolt 22 and the weld nut 26, the sealing rubber 24 provided to the collar 16 is press-contacted against the resin member 14, and the protruding portion 28 of the resin member 14 digs into the sealing rubber 24, due to the fastening force of the flange bolt 22. Sealing performance between the metal member 12 and the resin member 14 is improved by the press-contact force of the sealing rubber 24 in this manner.

In particular, in cases in which a fiber reinforced plastic is employed as the material of the resin member 14, even when, for example, a protruding portion abutting the fiber reinforced plastic is provided to a collar made of metal, not illustrated in the drawings, since the fiber reinforced plastic has a high strength, sometimes the protruding portion does not dig into the fiber reinforced plastic. It is difficult to secure sealing performance between the metal member and the resin member in such cases.

However, in the present exemplary embodiment, the protruding portion 28 of the resin member 14 digs into the sealing rubber 24 provided to the collar 16, such that the above-described issue does not arise. Thus the configuration of the present exemplary embodiment is effective in cases in which a fiber reinforced plastic is employed as the material of the resin member 14.

The outer peripheral face 20B and the lower face 20C of the flange portion 20 of the collar 16 are covered by the sealing rubber 24. Namely, in the present exemplary embodiment, the outer peripheral face 20B of the flange portion 20 is covered in a state in which the sealing rubber 24 wraps around an edge portion 20C1 of the lower face 20C of the flange portion 20. The fastening structure 10 of the present exemplary embodiment thereby enables water, dust, and the like to be suppressed or prevented from entering between the metal member 12 and the resin member 14, compared to, for example, a case in which only a lower face of a flange portion is covered by sealing rubber, not illustrated in the drawings.

As described above, in the present exemplary embodiment, the protruding portion 28 of the resin member 14 is set so as to dig into the sealing rubber 24 in the state in which the resin member 14 has been fastened to the metal member 12 by the flange bolt 22 and the weld nut 26. This enables rattling about between the resin member 14 and the collar 16 to be suppressed or prevented, even when the plate thickness of the resin member 14 has decreased due to creep deformation.

In cases in which a fiber reinforced plastic containing carbon is employed as the material of the resin member 14, for example, there is possibility of electrolytic corrosion occurring if the resin member 14 contacts metal. However, in the present exemplary embodiment, the collar 16 made of metal and the resin member 14 do not contact each other directly, and so the issue of electrolytic corrosion does not arise.

In the present exemplary embodiment, in the state in which the resin member 14 has been fastened to the metal member 12 by the flange bolt 22 and the weld nut 26, the protruding portion 28 formed on the resin member 14 digs into the sealing rubber 24. This enables relative movement between the resin member 14 and the sealing rubber 24 to be restricted in the shear direction (a direction orthogonal to the fastening direction of the flange bolt 22) by the protruding portion 28. Note that the sealing rubber 24 is integrally provided to the collar 16, thereby enabling relative movement between the collar 16 and the resin member 14 to be restricted in the shear direction as a result.

In the present exemplary embodiment, the protruding portion 28 is continuously formed along the circumferential direction around the through-hole 14A, thereby enabling the sealing performance between the metal member 12 and the resin member 14 to be further improved by the protruding portion 28.

The cross-section profile of the protruding portion 28 sectioned along the up-down direction forms a triangular shape. This enables good dig-in performance with respect to the sealing rubber 24.

In cases in which a collar is formed with sealing rubber as an integral unit, for example, the sealing rubber is press-fitted to the collar. In such cases, a press-fitting device is required, and the equipment cost increases. In cases in which sealing rubber is adhered to a collar, an adhesion process is required in addition to the cost of adhesive, such that the equipment cost increases. In contrast thereto, in the present exemplary embodiment, the sealing rubber 24 is integrally molded to the collar 16 by insert molding or the like, such that the above-described issues do not arise. This enables mass production at a low cost.

Other Exemplary Embodiments

In the present exemplary embodiment, the shape of the flange portion 20 formed on the collar 16 illustrated in FIG. 1 is a circular plate shape; however, there is no particular limitation to a circular plate shape, and the flange portion 20 may jut out an angular shape, or a waveform shape. The outer profile of the sealing rubber 24 is then formed to match the shape of the flange portion 20.

In the present exemplary embodiment, the sealing rubber 24 is integrally molded to the collar 16, thereby obtaining an advantageous effect of enabling mass production at a low cost. However, it is sufficient as long as the sealing rubber 24 is integrally provided to the collar 16 in the present invention. Thus it goes without saying that, from the perspective of using an existing collar, sealing rubber may be integrally provided to the collar by press-fitting or adhering the sealing rubber to the collar.

In the present exemplary embodiment, the outer peripheral face 20B and the lower face 20C of the flange portion 20 of the collar 16 are covered by the sealing rubber 24; however, the sealing rubber 24 is not necessarily formed across the entire outer peripheral face 20B and the entire lower face 20C of the flange portion 20. For example, configuration may be such that part of the outer peripheral face 20B and part of the lower face 20C, including at least the edge portion 20C1 of the lower face 20C of the flange portion 20, are covered by the sealing rubber 24.

In the present exemplary embodiment, the protruding portion 28 is continuously formed along the circumferential direction around the through-hole 14A. Namely, a single-protrusion protruding portion 28 is formed; however, a double-protrusion or a triple-protrusion protruding portion 28 may be formed. In the present invention, it is sufficient as long as sealing performance between the resin member 14 and the sealing rubber 24 can be secured. There is accordingly no limitation to the protruding portion 28, and for example, a configuration may be applied in which a groove portion is provided to the resin member 14, and a projection portion which fits into the groove portion is formed on the sealing rubber 24, not illustrated in the drawings.

The protruding portion 28 of the present exemplary embodiment has a cross-section profile sectioned along the up-down direction formed in a triangular shape, thereby improving dig-in performance with respect to the sealing rubber 24. However, the cross-section profile of the protruding portion 28 is not limited to a triangular shape. A trapezoidal shape, for example, may be formed.

In the present exemplary embodiment, the protruding portion 28 is continuously formed along the circumferential direction around the through-hole 14A; however the protruding portion 28 may be intermittently formed. Forming the protruding portion 28 intermittently enables relative movement between the collar 16 and the resin member 14 to be restricted by the flange bolt 22 in the shear direction orthogonal to the fastening direction.

The protruding portion 28 is provided below the flange portion 22B of the flange bolt 22; however, the fastening force due to the flange bolt 22 is transmitted through the collar 16, and so it is sufficient as long as the protruding portion 28 is provided below the collar 16 at least.

In the present exemplary embodiment, the flange bolt 22 has been explained as an example of a fastener; however, the fastener is not necessarily the flange bolt 22, and may be a hexagonal bolt. In cases in which the hexagonal bolt is employed, a metal washer or other washer may be employed.

In the present exemplary embodiment, the weld nut 26 is provided to the lower face 12B of the metal member 12; however, this member does not necessarily have to be the weld nut 26.

Second Exemplary Embodiment

Fastening Structure Configuration

Figure 2:
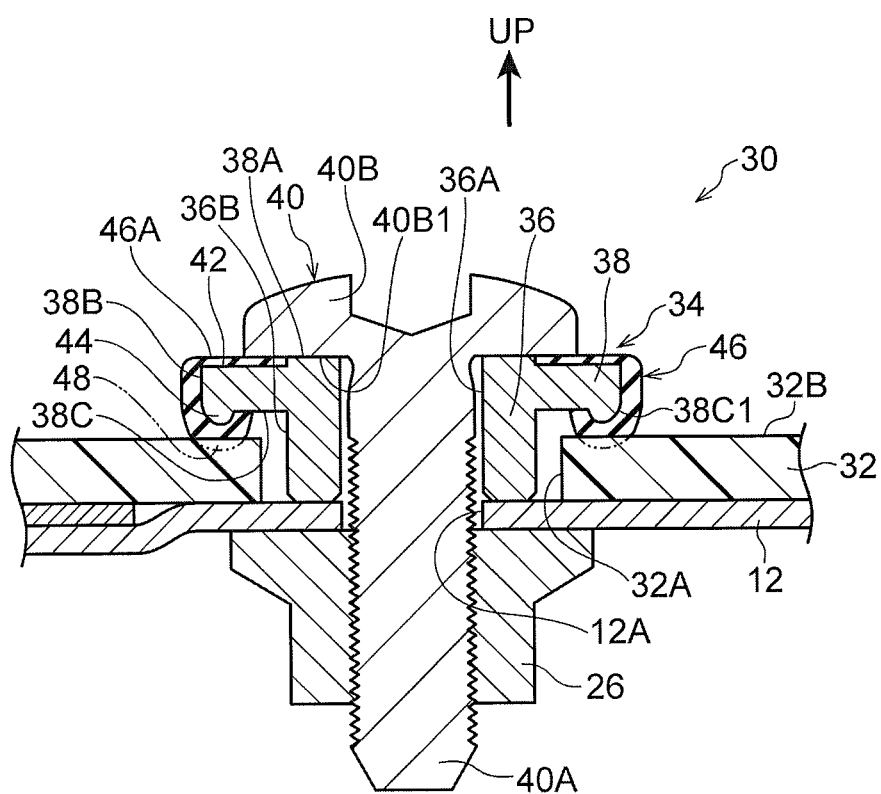
FIG. 2 is a cross-section illustrating a fastening structure according to a second exemplary embodiment.

Explanation follows regarding a fastening structure according to a second exemplary embodiment. FIG. 2 is a cross-section illustrating a fastening structure 30 according to the second exemplary embodiment. Note that members with substantially the same operation as the first exemplary embodiment are appended with the same reference numerals, and detailed explanation (including operation) thereof is omitted.

As illustrated in FIG. 2, similarly to in the first exemplary embodiment, in the fastening structure 30, a plate-shaped resin member 32 overlaps the plate-shaped metal member 12. A circular-shaped through-hole 32A, serving as a second through-hole and set with a larger diameter than the through-hole 12A formed in the metal member 12, is formed in the resin member 32. A tube portion 36, provided to a collar 34 made of metal, is capable of being inserted inside the through-hole 32A. A through-hole 36A, serving as a third through-hole, is formed in the tube portion 36. A shaft portion 40A of a flange bolt 40, serving as a fastener, is inserted through the through-hole 36A.

A circular plate-shaped flange portion 38 juts out toward the outside of the tube portion 36 from an upper end portion of the tube portion 36. The flange portion 38 is disposed facing an upper face 32B of the resin member 32. A lower face 40B1 of a head portion 40B of the flange bolt 40 is capable of abutting an upper face 38A of the flange portion 38.

A depressed portion 42 is provided to the upper face 38A of the flange portion 38, further to the outside than an outer peripheral face 36B of the tube portion 36, and is formed a step lower than the upper face 38A of the flange portion 38. A projection portion 44 that projects out toward the resin member 32 side at an outer edge portion of the flange portion 38 is continuously formed along the circumferential direction around the through-hole 32A of the resin member 32 at a lower face 38C of the flange portion 38. A leading end side of the projection portion 44 forms a shape projecting toward the resin member 32 side, and a leading end portion of the projection portion 44 is curved. Note that a cross-section profile of the projection portion 44 sectioned along the up-down direction may be formed in a semicircular shape, a triangular shape, a trapezoidal shape, or the like.

Substantially tube-shaped sealing rubber 46, serving as an elastic member, is integrally molded to the collar 34 so as to cover the depressed portion 42 of the flange portion 38, an outer peripheral face 38B serving as an outside face of the flange portion 38, and the lower face 38C of the flange portion 38. Namely, in the present exemplary embodiment, the sealing rubber 46 extends from the outer peripheral face 38B of the flange portion 38 of the collar 34 as far as a region facing (contacting) the head portion 40B of the flange bolt 40.

In a state in which the sealing rubber 46 has covered the depressed portion 42 of the flange portion 38, an upper face 46A of the sealing rubber 46 is set so as not to be lower than the upper face 38A of the flange portion 38. Namely, the upper face 46A of the sealing rubber 46 is set so as to reliably abut the lower face 40B1 of the head portion 40B of the flange bolt 40.

A press-contact portion 48 that projects out toward the resin member 32 side is continuously formed along the circumferential direction around the through-hole 32A of the resin member 32 at an outer edge portion of the sealing rubber 46. The press-contact portion 48 is formed in a position overlapping the projection portion 44 formed on the flange portion 38 of the collar 34, as viewed from the direction in which the fastening force of the flange bolt 40 and the weld nut 26 acts. A leading end side of the press-contact portion 48 forms a bulge-shape bulging toward the resin member 32 side, and a leading end portion of the press-contact portion 48 is curved. Note that a cross-section profile of the press-contact portion 48 sectioned along the up-down direction may be formed in a semicircular shape, a triangular shape, a trapezoidal shape, or the like, and the shape of the press-contact portion 48 is not necessarily the same as the shape of the projection portion 44.

Note that a portion of the press-contact portion 48, indicated by a phantom line, is pressed against the upper face 32B of the resin member 32 by the fastening force of the flange bolt 40 and the weld nut 26, and undergoes elastic deformation. Namely, the press-contact portion 48 undergoes elastic deformation in a state in which the resin member 32 has been fastened to the metal member 12 by the flange bolt 40 and the weld nut 26, and is elastically press-contacted against the resin member 32.

Operation and Advantageous Effects of Fastening Structure

As illustrated in FIG. 2, in the state in which the resin member 32 has been fastened to the metal member 12 by the flange bolt 40 and the weld nut 26, the press-contact portion 48 formed in the sealing rubber 46 provided to the collar 34 is pressed against the resin member 32, and undergoes elastic deformation.

The sealing rubber 46 provided to the collar 34 is thereby press-contacted against the resin member 32, and the press-contact portion 48 of the sealing rubber 46 is elastically press-contacted against the resin member 32, by the fastening force due to the flange bolt 40 and the weld nut 26. The sealing performance between the metal member 12 and the resin member 32 is improved by the press-contact force of the sealing rubber 24 in this manner.

The press-contact portion 48 of the sealing rubber 46 is elastically press-contacted against the resin member 32, thereby enabling relative movement between the collar 34 and the resin member 32 to be restricted by the flange bolt 40 and the weld nut 26 in the shear direction orthogonal to the fastening direction.

In the present exemplary embodiment, the depressed portion 42 of the flange portion 38 of the collar 34, the outer peripheral face 38B serving as the outside face of the flange portion 38, and the lower face 38C of the flange portion 38 are covered by the sealing rubber 24.

Namely, in the present exemplary embodiment, the outer peripheral face 38B of the flange portion 38 is covered in a state in which the sealing rubber 24 wraps around an edge portion 38C1 of the lower face 38C of the flange portion 38. The fastening structure 30 of the present exemplary embodiment thereby enables water, dust, and the like to be suppressed or prevented from entering between the collar 34 and the resin member 32, compared to, for example, a case in which only a lower face of a flange portion is covered by sealing rubber, not illustrated in the drawings.

In the present exemplary embodiment, the sealing rubber 46 extends from the outer peripheral face 38B of the flange portion 38 of the collar 34 as far as a region facing the head portion 40B of the flange bolt 40, such that the sealing rubber 46 is also provided between the flange portion 38 and the head portion 40B of the flange bolt 40. This enables water, dust, and the like to also be suppressed or prevented from entering between the collar 34 and the flange bolt 40.

As described above, in the present exemplary embodiment, in the state in which the resin member 14 has been fastened to the metal member 12 by the flange bolt 40 and the weld nut 26, the press-contact portion 48 of the sealing rubber 46 is set so as to be elastically press-contacted against the resin member 32. This enables rattling about between the resin member 32 and the collar 34 to be suppressed or prevented, even when the plate thickness of the resin member 32 has decreased due to creep deformation.

Figure 5:
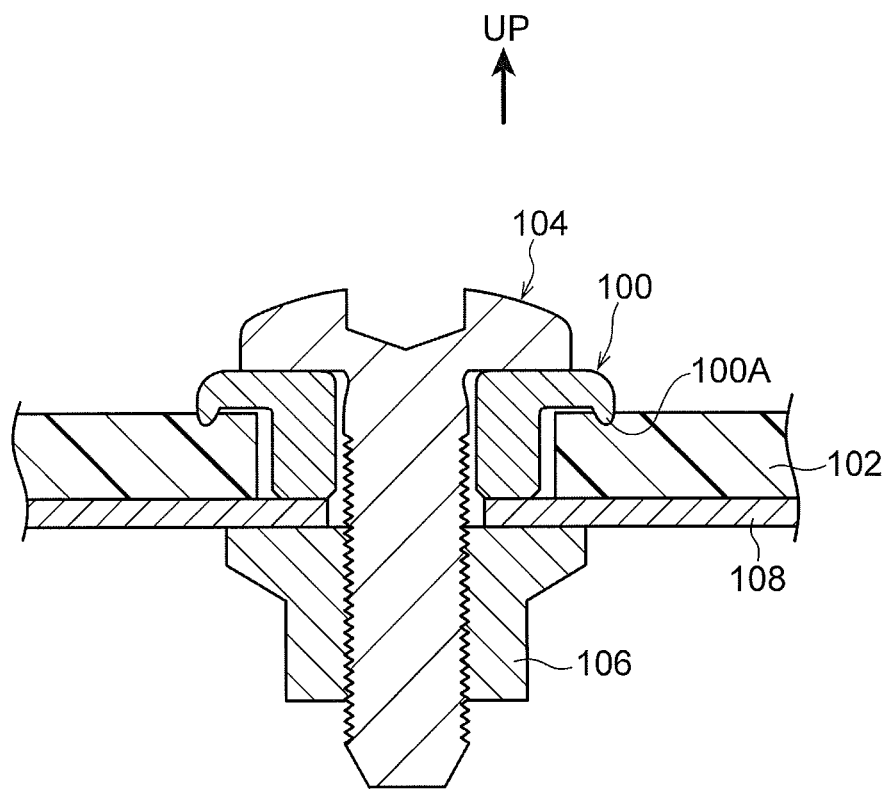
FIG. 5 is a cross-section corresponding to FIG. 2, illustrating a comparative example.

As explained in the first exemplary embodiment, in cases in which a fiber reinforced plastic containing carbon is employed as the material of the resin member 32, there is a possibility of electrolytic corrosion occurring if the fiber reinforced plastic contacts metal. Specifically, as illustrated in FIG. 5, for example, a protruding portion 100A that abuts a fiber reinforced plastic 102 is provided to a collar 100 made of metal. When the protruding portion 100A is made to dig into the fiber reinforced plastic 102 by fastening force due to a flange bolt 104 and a weld nut 106, since the fiber reinforced plastic 102 has a high strength, the protruding portion 100A sometimes does not dig into the fiber reinforced plastic 102.

Electro-deposition (ED) coating (electrolytic corrosion coating) is applied in advance to the surfaces of the collar 100 and a metal member 108 in order to prevent corrosion; however, there is a possibility of this ED coating flaking off when attempting to make the protruding portion 100A dig into the fiber reinforced plastic 102 with undue force. In such cases, there is a possibility of galvanic corrosion (electrolytic corrosion) occurring due to the contact between the fiber reinforced plastic 102 and the collar 100.

However, in the present exemplary embodiment, as illustrated in FIG. 2, the sealing rubber 46 is provided between the collar 34 made of metal and the resin member 32, such that there is no direct contact between the collar 34 and the resin member 32. Thus, the issue of electrolytic corrosion does not arise in the present exemplary embodiment.

In the present exemplary embodiment, the projection portion 44 formed on the flange portion 38 of the collar 34 and the press-contact portion 48 formed on the sealing rubber 46 are formed in positions overlapping each other, as viewed from the direction in which the fastening force due to the flange bolt 40 and the weld nut 26 acts. This enables the sealing rubber 46 to be pressed against the resin member 32 by the projection portion 44 of the collar 34. The press-contact force against the resin member 32 by the press-contact portion 48 formed on the sealing rubber 46 is thereby increased.

This enables the sealing performance between the collar 34 and the resin member 32 to be further improved compared to, for example, cases in which the press-contact portion 48 and the projection portion 44 are provided in positions offset from each other viewed from the direction in which the fastening force due to the flange bolt 40 and the weld nut 26 acts. This also enables relative movement between the collar 34 and the resin member 32 to be further restricted in the shear direction. Note that it goes without saying that the press-contact portion 48 and the projection portion 44 may be provided in positions offset from each other viewed from the direction in which the fastening force due to the flange bolt 40 and the weld nut 26 acts.

Other Exemplary Embodiments

In the above exemplary embodiments, explanation has mainly been regarding a fastening structure of non-movable members; however, in a fastening structure of members including a movable member, adhesive is sometimes applied between a resin member and a metal member, in addition to the above exemplary embodiments.

Figure 3:
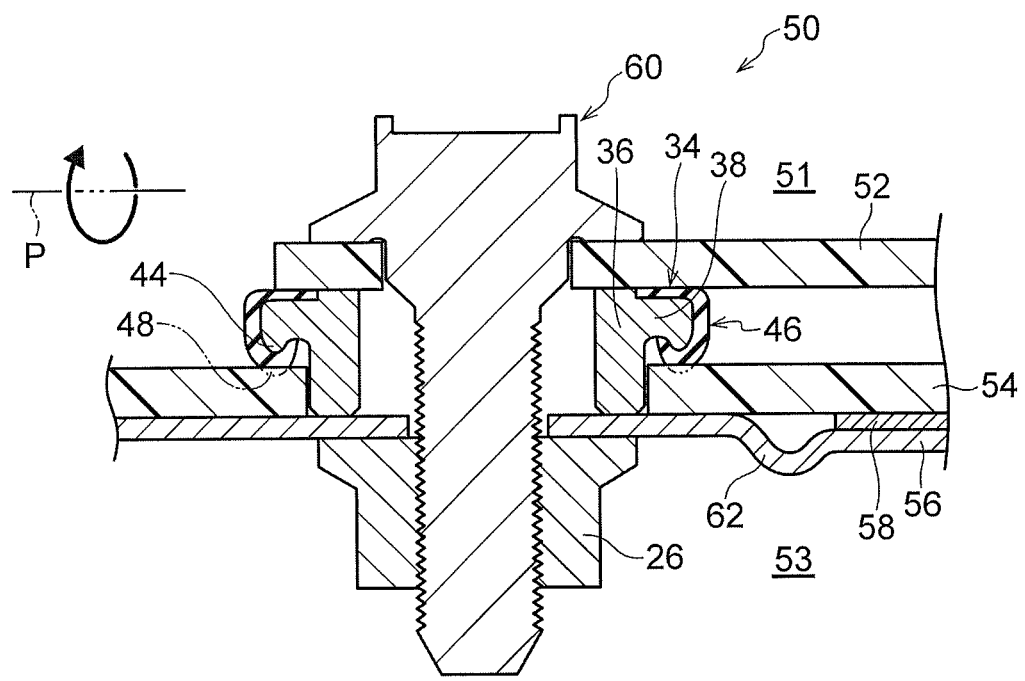
FIG. 3 is a cross-section illustrating a modified example (1) of a fastening structure according to the second exemplary embodiment.

(1) As illustrated in FIG. 3, for example, in a hinge section of a vehicle back door or the like, not illustrated in the drawings, in a fastening structure 50 applied at a movable side, a collar 34 is provided between a resin member 52 provided at a cabin exterior 51 side, and a resin member 54 provided at a back door interior 53 side, to suppress or prevent water, dust, or the like from entering the back door interior 53 side. A metal member 56 is fastened to the resin member 52, the collar 34, and the resin member 54 by a flange bolt 60 and the weld nut 26, serving as a fastener, these become an integral unit, and are moved by pivoting in the arrow direction about a pivot axis P of the door. In the present exemplary embodiment, adhesive 58 is provided between the resin member 54 and the metal member 56.

Note that, since the resin member 54 and the metal member 56 need to be firmly fixed together, relative movement of both members with respect to shear force occurring between the resin member 54 and the metal member 56 is suppressed or prevented, not only by the fastening force due to the flange bolt 60 and the weld nut 26, but also by the adhesive 58.

Note that the adhesive 58 can be used to temporarily hold the resin member 54 and the metal member 56 together prior to fastening using the flange bolt 60 and the weld nut 26. An accumulation portion 62 that has a recessed shape with respect to a coating face 56A of the adhesive 58 may be provided in close proximity to a coating region of the adhesive 58. Excess adhesive 58 thereby flows into the accumulation portion 62; however, this accumulation portion 62 is not necessarily required.

Figure 4:
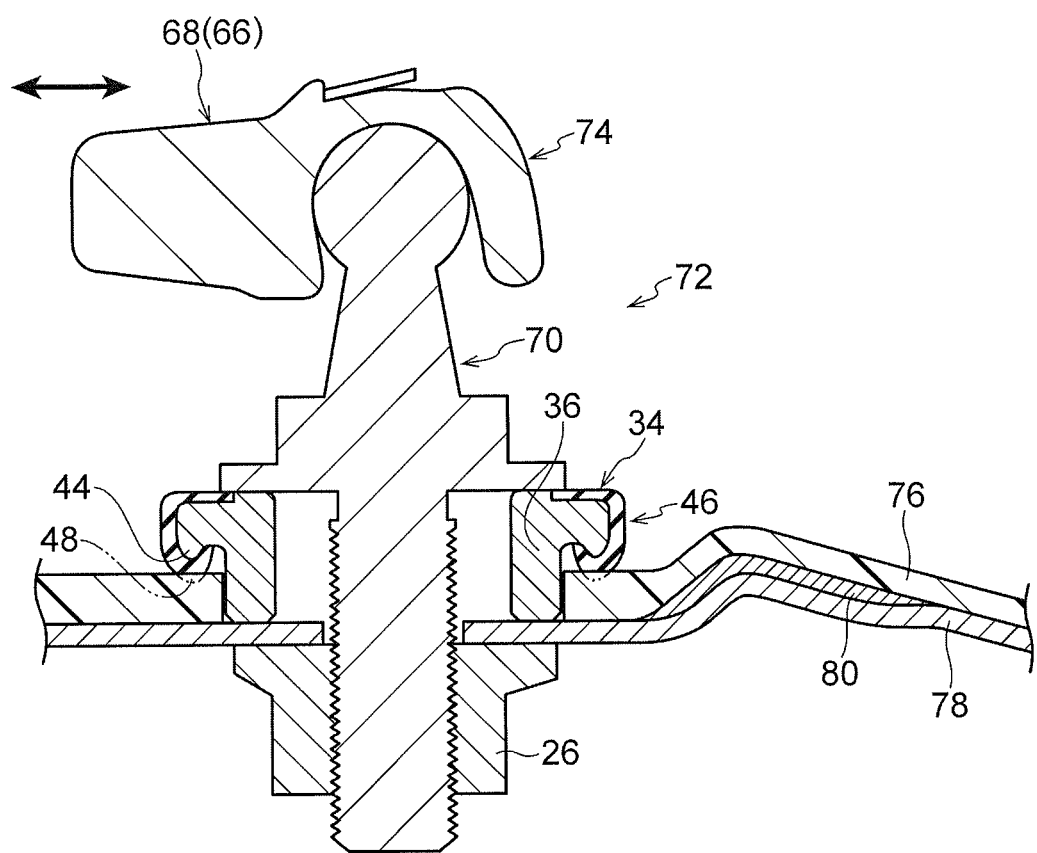
FIG. 4 is a cross-section illustrating a modified example (2) of a fastening structure according to the second exemplary embodiment.

(2) Other than the above exemplary embodiments, as illustrated in FIG. 4, application may be made to a fastening bolt 70, serving as a fastener coupled to a damper section 66 of a vehicle back door, not illustrated in the drawings. In a fastening structure 72 including the fastening bolt 70, a piston 68 configuring part of the damper section 66 moves in a straight line along its axial direction (the arrow direction), such that moment acts on the fastening bolt 70 about a coupling portion 74 with the piston 68. There is accordingly a possibility that shear force arises between the fastening bolt 70 and the collar 34. Adhesive 80 is thereby provided between a resin member 76 and a metal member 78, and relative movement of both members is suppressed or prevented, with respect to shear force occurring between the resin member 76 and the metal member 78, by the collar 34.

Exemplary embodiments of the present invention have been explained above; however, the present invention is not limited to the above description and obviously various other modifications may be implemented with a range not departing from the spirit of the present invention.

The invention claimed is:

1. A fastening structure, comprising:
    a plate-shaped metal member that is formed with a first through-hole through which a fastener is inserted;
    a plate-shaped resin member that overlaps the metal member, that is formed with a second through-hole with a larger diameter than the first through-hole, and that is fastened to the metal member by the fastener;
    a collar that is made of metal and includes a tube portion inserted into the second through-hole and formed with a third through-hole through which the fastener is inserted, and a flange portion disposed facing the resin member in a state in which the tube portion has been inserted into the second through-hole; and
    an elastic member that is integrally provided at the collar, that is disposed between the flange portion and the resin member, and that covers an outer peripheral face of the flange portion and a lower face that is a face of the flange portion facing the resin member, wherein:
    on the elastic member, a press-contact portion is provided that projects toward a side of the resin member and is press-contacted against the resin member in a state in which the resin member has been fastened to the metal member by the fastener,
    on the collar, a projection portion that projects toward the resin member side at a position of the flange portion facing the resin member and that has a leading end portion formed in a bulge-shape bulging toward a side of the resin member, is formed on the lower face of the flange portion, and
    the press-contact portion and the projection portion are provided at positions that overlap with each other as viewed from a direction in which fastening force due to the fastener acts.

2. The fastening structure of claim 1, wherein, on the elastic member, the press-contact portion that is press-contacted against the resin member in a state in which the resin member has been fastened to the metal member by the fastener, is continuously formed around the second through-hole.

3. The fastening structure of claim 1, wherein, on the elastic member, the press-contact portion that is press-contacted against the resin member in a state in which the resin member has been fastened to the metal member by the fastener, is intermittently formed around the second through-hole.

4. The fastening structure of claim 1, wherein, on the collar, the projection portion that projects toward the resin member side at a position of the flange portion facing the resin member, is continuously formed around the second through-hole.

5. The fastening structure of claim 1, wherein, on the collar, the projection portion that projects toward the resin member side at a position of the flange portion facing the resin member, is intermittently formed around the second through-hole.

6. The fastening structure of claim 1, wherein the elastic member wraps around an outside face of the flange portion and extends as far as a region contacting the fastener.

7. The fastening structure of claim 6, wherein:
    a depressed portion that is formed a step lower than an upper face of the flange portion is provided at the upper face of the flange portion, further to an outer side than an outer peripheral face of the tube portion; and
    the depressed portion of the flange portion, the outer peripheral face of the flange portion, and the lower face of the flange portion are covered by the elastic member.

8. The fastening structure of claim 1, wherein the elastic member is integrally molded to the collar.

\* \* \* \* \*